April 29, 1958  M. H. NOVEMBER  2,832,374
FLEXIBLE TUBE ASSEMBLIES
Filed March 10, 1955  2 Sheets-Sheet 1
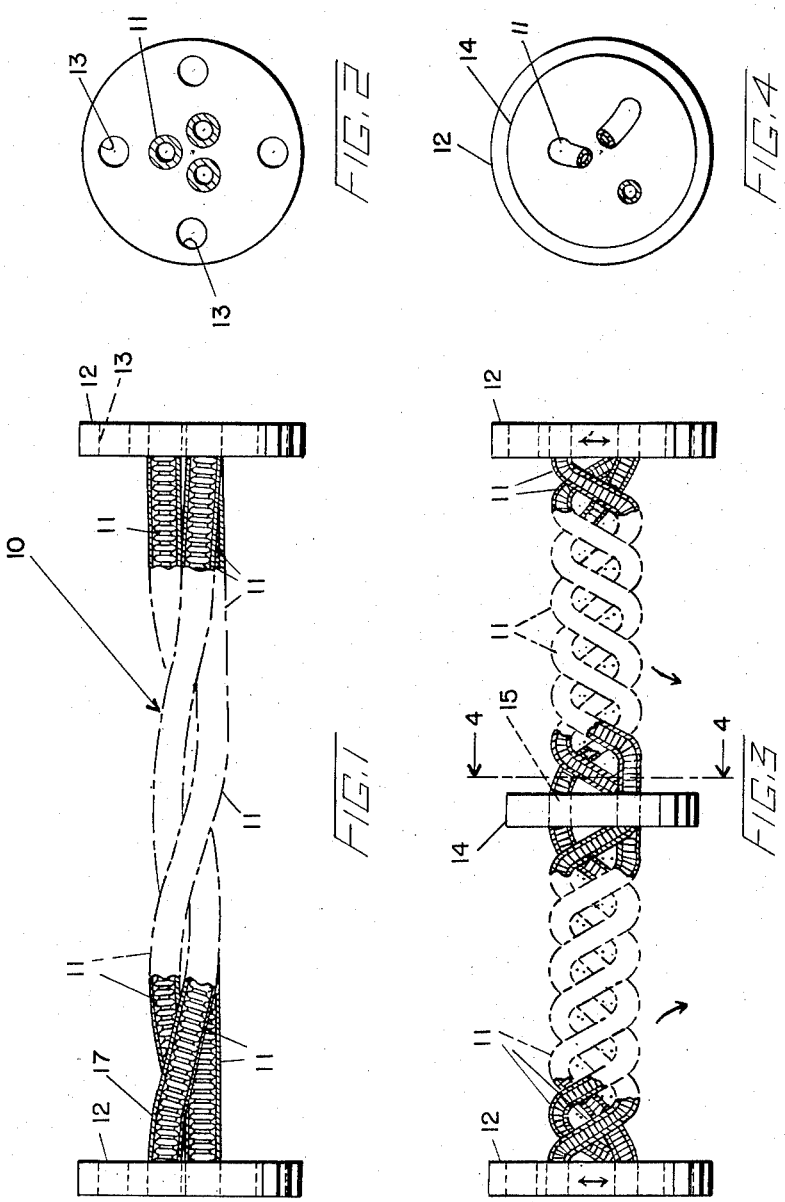
INVENTOR.
MILTON H. NOVEMBER
BY Albert F. Kronman
ATTORNEY April 29, 1958  M. H. NOVEMBER  2,832,374
FLEXIBLE TUBE ASSEMBLIES
Filed March 10, 1955  2 Sheets-Sheet 2
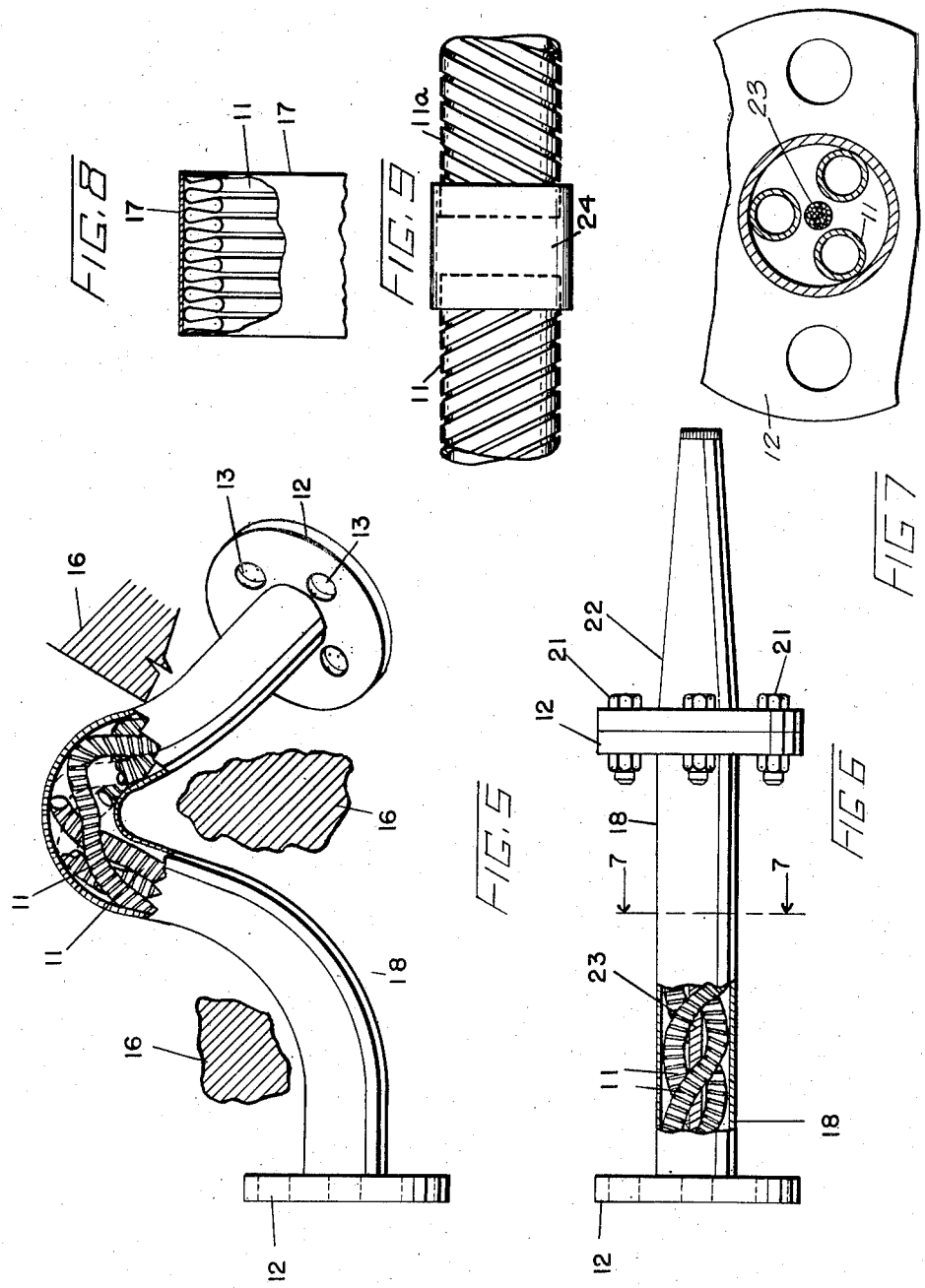
INVENTOR.
MILTON H. NOVEMBER
BY
ATTORNEY United States Patent Office 2,832,374
Patented Apr. 29, 1958

2,832,374
FLEXIBLE TUBE ASSEMBLIES
Milton H. November, Montclair, N. J., assignor to Breeze Corporations, Inc., Union, N. J., a corporation of New Jersey Application March 10, 1955, Serial No. 493,491
3 Claims. (Cl. 138—50)

This invention relates to conduit assemblies and more particularly conduit assemblies for use under conditions of expansion, contraction, torsion and shock.

Where flexible tubing is presently used for conduit purposes, it provides certain advantages by way of ease of coupling, handling and the like, but is also subject to a fairly short useful life.

Where flexible tubing is used between members which vary with respect to their relative positions, the continued stresses to which the tubing is subjected results in early operational failure.

Flexible tubing used for the conduction of fluids undergoes expansion and contraction due to thermal changes, surging or pulsating of the fluid therein and a certain amount of linear extension which in the case of spirally wound flexible tubing results in torque.

Where convoluted tubing is employed to join adjacent lines, it is often necessary to form a loop or bend in the tubing between the said lines.

Presently known tubings are limited in the degree of bend to which they may be subjected because of the fact that the inner radii of the bend compresses the tubing.

Accordingly, it is an object of the present invention to provide a conduit assembly formed from convoluted flexible tubing which will have a long useful life despite the effects of externally applied loads created by the relative movements of members joined together with the assembly.

Another object of the present invention is to provide a flexible tube conduit having a higher degree of flexibility than previously known conduits so as to permit use where space limitations require small bend radii to effect coupling.

A further object of the present invention is to provide a fluid conducting conduit of convoluted tubing which will insure fluid transmission despite partial failure thereof.

Another object of the present invention is to provide a flexible tube conduit which will permit the coupling of spaced members where no loop can be employed for the absorption of relative motion between the members.

A still further object of the invention is to provide a flexible tube conduit capable of withstanding torsional strain and at the same time having a relatively high degree of in-line extensibility and compressibility.

A feature of this invention is its use of a plurality of convoluted tubes which are helically twisted or wrapped together whereby a high degree of flexibility is attained without sacrificing expansion and compression characteristics.

Another feature of the present invention is its use of right and left hand helically wound tube structures in the same assembly for eliminating the effects of torque.

A further feature of the present device is its use of a plurality of left and right hand twisted or wrapped tubes for the purpose of eliminating torsional strain.

Another feature of the present invention is its use of a "floating" block carried by the tubes between oppositely twisted portions thereof for absorbing torsional strain.

The invention consists of the construction, combination and arrangement of parts, as herein illustrated, described and claimed.

In the accompanying drawings, forming a part hereof, are illustrated four forms of embodiment of the invention, in which drawings similar reference characters designate corresponding parts, and in which:

Figure 1 is a view in side elevation, partially cut away, of a complete flexible conduit assembly according to one embodiment of the present invention.

Figure 2 is an end view of the assembly shown in Figure 1, showing the coupling flange thereof.

Figure 3 is a view in side elevation, partially cut away, of a second embodiment of the present invention, employing right hand and left hand twisted tubing.

Figure 4 is a vertical sectional view taken on line 4—4 of Figure 3 looking in the direction of the arrows.

Figure 5 is a view in side elevation, partially cut away for the sake of illustrating the behavior of the tubing within a sharp bend.

Figure 6 is a view in elevation of a high pressure nozzle assembly employing a third embodiment of the present invention, said nozzle being broken away to disclose the conduit structure therein.

Figure 7 is a vertical fragmentary section taken on line 7—7 of Figure 6, somewhat enlarged.

Figure 8 is an enlarged fragmentary view of a flexible tube member such as may be used in the present invention.

Figure 9 is a view in side elevation of a fourth embodiment of the present invention employing right and left hand helically wound tubing.

Referring to the drawings and more specifically to Figure 1, 10 designates a plurality of flexible conduits made up of lengths of convoluted tubing 11. The tubing 11 may be of the seamless or welded seam construction and may be either spirally wound tubing or of longitudinally lapped and welded construction.

At each end of the assembly 10, there is provided a flange or plate 12, which plate is suitably bored to receive therein, one end of each of the lengths of tubing 11. The tubing 11 may be secured within the flange 12 as by welding, soldering, or any other suitable means.

The tubing 11 is disposed between the flanges 12 in a twisted or wound form. In the embodiment shown in Figure 1, three such tubes 11 are wound together to form a flexible conduit assembly. However, it is within the purview of the present invention to employ only two such tubes 11 or a plurality of tubes in excess of three. It has been found that the larger the number of tubes 11 employed in such an assembly, the greater will be the flexibility of such assembly, as will become apparent from the subsequent discussion of the showing of Figure 5.

The helical twist imparted to the tubes 11 may be varied to suit the particular application of the assembly 10. Where large torsional movement is to be anticipated and a minimum of extension and compression of the conduit is desired, the tubes may be given a broad helical twist. A relatively small helical twist will permit a greater extension and compression of the tubes. It will thus be seen that a wide variety of torsive, extensive and compressive characteristics may be achieved with the hereindescribed structures without departing from the spirit of the invention.

In certain applications where coupling is to be effected between lines or bodies where space requirements prohibit the use of a loop in the flexible coupling and where the said bodies, nevertheless, are prone to move toward or away from each other, the embodiment shown in Figure 3 has proved to be highly efficient.

In this second embodiment of the invention, a "floating" block 14 is employed between the flanges 12. The tubes 11 connecting one flange 12 with the block are provided with a right hand twist and the tubes connecting the second flange 12 with the block are oppositely wound or twisted, as illustrated. The block is suitably bored, as indicated at 15, to receive the ends of the tubes 11 and to permit the passage of fluid therethrough.

When the flanges 12 are forced together under external compression, the moments tending to rotate the tubes 11 in one direction and the forces which tend to rotate the tubes on the opposite portion of the assembly are directed inwardly of the flanges 12 by reason of the right hand and left hand twists of the tubes 11 and are absorbed by the block 14 which is free to rotate and thereby absorb the torque.

As a result of this construction, the coupling does not buckle or form a loop under compression. Conversely, when the flanges 12 are pulled apart during use of the coupling, the forces which would tend to unwind the tubes 11 are shifted to the center of the assembly and rotate the block 14.

Where a more inexpensive coupling is desired and where space requirements permit a loop to be formed, the structure shown in Figure 1 may be preferred.

It is also possible with the coupling of Figure 1 to pass the tubing around obstructions such as are indicated at 16 in Figure 5.

Figure 5 further serves to show how an assembly made up of a plurality of tubes 11 can be bent at an angle which is more acute than that which any single tube having a cross-section equal to the entire assembly is capable of assuming. An examination of Figure 5 will show that the path of any single tube 11 through the sharp bend involves a series of gradual bends, none of which is as acute as that of the entire assembly. Since the individual tubes are not sharply bent, they can recover from their moderately bent position with ease and the entire assembly is thus capable of both sharp bends involving small radii and the ability to recover its original shape following such bending.

It will therefore be seen that a degree of flexibility has been achieved by the assembly which surpasses anything possessed by a single tube of equal cross-section and fluid carrying capacity.

Referring to Figure 6, there is shown a third embodiment of the present invention as applied to a nozzle member 22. In this embodiment the flange 12 is bolted to the nozzle 22 by means of bolts 21 and a protective covering 18 which may be of rubber, neoprene or the like, is slipped over the flexible tubing 11. Under internal pressure, there would be a tendency for the wound tubing 11 to straighten out so as to destroy the flexibility of the assembly. In order to prevent this, the longitudinal dimension of the assembly is fixed by means of a central cable 23 about which the tubing 11 is wound. Since the tubing is prevented from elongating, it is also prevented from straightening out and a high degree of flexibility is maintained.

As shown in Figure 7, the cable 23 is centrally disposed within the assembly and is maintained in this position by the tubing 11 which is wrapped around the cable 23 for its entire length and also by reason of said cable being secured at each end to the flanges 12.

The tubing employed for the purposes of the present invention is generally of a convoluted shape, such as is shown in Figure 8, and may be provided with a protective covering 17, such as rubber, woven metal braid, or the like.

Referring to Figure 9, there is shown a fourth embodiment of the present invention for use in connection with a single fluid line. The tubing 11 in one portion of the line is preferably of the helically wound convoluted type having a right hand winding disposition.

One end of the tubing 11 is secured to a sleeve-like block 24 which is centrally bored to receive the end of said tubing 11. The opposite side of the block 24 is secured to a second section of helically wound tubing 11ª, which tubing is provided with a left hand disposition of twist.

The construction shown in Figure 9 behaves in a manner similar to that shown in Figure 3, although only single tubes, 11, 11ª, are used in the line. Thus, when the ends of the tubes, 11, 11ª, which may be attached to flanges (not shown) are moved toward or away from one another, the block 24 will be caused to rotate as a result of the helical construction of the tubes, 11, 11ª. Here again as in the previously discussed construction, the torque is shifted from the flanges to which the tube is affixed to the block 24, which is free to rotate so that damage to the tubes at their fixed points, that is, next to the flanges, is avoided.

It will be apparent from the foregoing that certain modification to the above construction may be achieved without departing from the spirit of the invention. Thus, for example, the showing of Figure 3 would be operable if the central block 14 were omitted and the right and left hand twisted tubes connected at the point where they enter the block. With this construction, the central portion of the assembly would rotate under the forces of extension or compression in the manner previously described in connection with the block 14. The use of the block provides certain advantages by way of anchoring the ends of the tubing, supporting the tubing, and may even form a bearing surface upon which the assembly may be supported by external members (not shown).

Similarly, the right and left hand wound helical tubes of Figure 9, may be joined as by welding, or brazing, without the use of the block 24, and without changing the operation of the device. Nevertheless, it is to be understood that the use of the block 24 does present certain advantages by way of imparting additional strength to the assembly at this point.

From the foregoing, it will be apparent that there has been provided coupling assemblies which lend themselves to installations with spatial requirements which formerly prohibited the use of flexible tubing and which assemblies will enjoy a useful life far in excess of those possessed by presently known devices.

Having thus fully described the invention, what is claimed as new and desired to be secured by Letters Patent of the United States, is:

1. A flexible fluid conduit assembly comprising spaced, pierced flange members, a plurality of flexible tubes secured at each end thereof to one of said flanges in register with an opening therein, said tubes being helically disposed about one another in a clockwise direction for part of their length and in a counter-clockwise direction for the remainder of their length between the spaced flanges.

2. A flexible fluid conduit assembly comprising spaced, pierced flange members, a plurality of flexible tubes secured at each end thereof to one of said flanges in register with an opening therein, said tubes being helically disposed about one another in a clockwise direction for part of their length and in a counter-clockwise direction for the remainder of their length between the spaced flanges and a pierced, floating block incorporated into the tube assembly where the oppositely twisted lengths of tubing meet.

3. A flexible fluid conduit assembly comprising a length of helically wound convoluted flexible tubing having a clockwise winding structure, a length of helically wound convoluted flexible tubing having a counter-clockwise winding structure and a pierced block member adapted to receive one end of each of the lengths of tubing so as to join them into a continuous fluid conducting assembly.

References Cited in the file of this patent

UNITED STATES PATENTS

| | | |
|---|---|---|
| 607,932 | Husbam | July 26, 1898 |
| 644,039 | Benton | Feb. 20, 1900 |
| 1,481,255 | Cumfer | Jan. 22, 1924 |
| 2,578,280 | Barnard | Dec. 11, 1951 |

FOREIGN PATENTS

| | | |
|---|---|---|
| 15,510 | Great Britain | June 29, 1914 |